US012108468B1

(12) United States Patent
Thantharate et al.

(10) Patent No.: US 12,108,468 B1
(45) Date of Patent: Oct. 1, 2024

(54) CELL SELECTION MANAGEMENT FOR AIRBORNE MOBILE STATIONS

(71) Applicant: T-MOBILE INNOVATIONS LLC, Overland Park, KS (US)

(72) Inventors: Anurag Thantharate, Overland Park, KS (US); Sougata Saha, Olathe, KS (US); Sreekar Marupaduga, Overland Park, KS (US); Atul Kulkarni, Brambleton, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 257 days.

(21) Appl. No.: 17/227,060

(22) Filed: Apr. 9, 2021

(51) Int. Cl.
*H04W 76/10* (2018.01)
*H04W 8/24* (2009.01)
*H04W 48/20* (2009.01)
*H04W 56/00* (2009.01)

(52) U.S. Cl.
CPC ............ *H04W 76/10* (2018.02); *H04W 8/24* (2013.01); *H04W 48/20* (2013.01); *H04W 56/001* (2013.01)

(58) Field of Classification Search
CPC ..... H04W 56/001; H04W 8/24; H04W 48/20; H04W 76/10
See application file for complete search history.

(56) References Cited

U.S. PATENT DOCUMENTS

| 4,912,480 | A | * | 3/1990 | Lopez | ................ | H01Q 21/005 |
| | | | | | | 342/413 |
| 5,126,751 | A | * | 6/1992 | Wada | .................. | H01Q 9/0485 |
| | | | | | | 343/789 |
| 5,752,164 | A | * | 5/1998 | Jones | ..................... | H04W 24/08 |
| | | | | | | 455/67.11 |
| 5,768,266 | A | * | 6/1998 | Thompson | ......... | H04B 7/18539 |
| | | | | | | 370/347 |
| 9,687,741 | B1 | * | 6/2017 | Kim | .................... | A63F 13/2145 |
| 9,715,609 | B1 | * | 7/2017 | Fink | ...................... | H04B 7/0408 |
| 10,130,872 | B2 | * | 11/2018 | Buhr | ...................... | G06Q 50/01 |
| 10,644,916 | B1 | * | 5/2020 | Shattil | .................... | H04L 45/24 |
| 10,826,568 | B1 | * | 11/2020 | Zhou | ...................... | H04B 7/086 |
| 11,350,288 | B1 | * | 5/2022 | Dennis | .................. | H04W 16/18 |
| 11,448,754 | B2 | * | 9/2022 | Cattle | ...................... | G01S 13/89 |
| 2002/0058477 | A1 | * | 5/2002 | Chapelle | ............ | H04W 52/283 |
| | | | | | | 455/431 |
| 2002/0058478 | A1 | * | 5/2002 | de La Chapelle | .... | H04W 52/08 |
| | | | | | | 455/431 |
| 2002/0058503 | A1 | * | 5/2002 | Gutowski | ............. | H04W 24/00 |
| | | | | | | 455/67.11 |

(Continued)

*Primary Examiner* — Michael J Moore, Jr.
*Assistant Examiner* — Prenell P Jones
(74) *Attorney, Agent, or Firm* — Shook, Hardy & Bacon L.L.P.; Sarah Rieth

(57) ABSTRACT

Embodiments of the present disclosure are directed to systems and methods for facilitating optimized cell selection for airborne user devices, such as wirelessly connected unmanned aerial vehicles. One or more synchronization signals may be modified to include one or more parameters that would improve airborne cell selection, including radiation center height, vertical beamwidth, horizontal beamwidth and frequency band availability. By optimizing cell selection and therefore reducing unnecessary handovers, the airborne user device will spend less battery power and processing resources, improving overall performance.

8 Claims, 6 Drawing Sheets

(56) References Cited

U.S. PATENT DOCUMENTS

| | | | | |
|---|---|---|---|---|
| 2002/0063656 A1* | 5/2002 | Gutowski | | H04W 24/00 |
| | | | | 342/360 |
| 2003/0093187 A1* | 5/2003 | Walker | | B64D 45/0059 |
| | | | | 701/1 |
| 2003/0186712 A1* | 10/2003 | Tillotson | | H04B 7/18506 |
| | | | | 455/278.1 |
| 2004/0203716 A1* | 10/2004 | Tillotson | | H04W 16/00 |
| | | | | 455/423 |
| 2005/0124291 A1* | 6/2005 | Hart | | G08G 3/02 |
| | | | | 455/12.1 |
| 2006/0084441 A1* | 4/2006 | Dowling | | H04W 24/04 |
| | | | | 455/445 |
| 2012/0252447 A1* | 10/2012 | Sartori | | H04W 24/10 |
| | | | | 455/434 |
| 2014/0184457 A1* | 7/2014 | Lea | | H01Q 21/0075 |
| | | | | 343/747 |
| 2014/0213307 A1* | 7/2014 | Minor | | H04M 15/41 |
| | | | | 455/457 |
| 2015/0141027 A1* | 5/2015 | Tsui | | H04W 24/02 |
| | | | | 455/452.1 |
| 2015/0327079 A1* | 11/2015 | Wu | | H04W 52/0206 |
| | | | | 455/562.1 |
| 2016/0254889 A1* | 9/2016 | Shattil | | H04L 12/2854 |
| | | | | 370/329 |
| 2016/0381596 A1* | 12/2016 | Hu | | H04W 28/0268 |
| | | | | 370/236 |
| 2017/0117950 A1* | 4/2017 | Strong | | H04B 7/0452 |
| 2017/0171792 A1* | 6/2017 | Axmon | | H04W 84/06 |
| 2017/0180038 A1* | 6/2017 | Oza | | H04B 7/18513 |
| 2017/0245165 A1* | 8/2017 | Onggosanusi | | H04W 24/08 |
| 2017/0302419 A1* | 10/2017 | Liu | | H04W 72/23 |
| 2017/0366250 A1* | 12/2017 | Ovens | | H04B 7/18506 |
| 2017/0372038 A1* | 12/2017 | Gupta | | G16H 40/63 |
| 2018/0068567 A1* | 3/2018 | Gong | | G08G 5/0039 |
| 2018/0097285 A1* | 4/2018 | Tang | | H04B 7/185 |
| 2018/0248613 A1* | 8/2018 | Peitzer | | H04B 17/12 |
| 2018/0316464 A1* | 11/2018 | Stern-Berkowitz | | |
| | | | | H04L 1/1692 |
| 2019/0036578 A1* | 1/2019 | Zirwas | | H04B 7/0469 |
| 2019/0158166 A1* | 5/2019 | Takano | | H04W 48/16 |
| 2019/0208482 A1* | 7/2019 | Tooher | | H04L 27/26025 |
| 2019/0229776 A1* | 7/2019 | Cao | | H04W 74/0833 |
| 2020/0135666 A1* | 4/2020 | Mergens | | H01L 23/60 |
| 2020/0259250 A1* | 8/2020 | Diamond | | H01Q 21/06 |
| 2020/0333434 A1* | 10/2020 | Chancey | | G09B 9/54 |
| 2020/0337029 A1* | 10/2020 | Yi | | H04L 5/0053 |
| 2020/0395991 A1* | 12/2020 | Ryu | | H04B 17/102 |
| 2021/0168725 A1* | 6/2021 | Muruganathan | | H04W 52/146 |
| 2021/0240205 A1* | 8/2021 | Kwak | | G05D 1/0816 |
| 2021/0266126 A1* | 8/2021 | Sun | | H04L 5/0048 |
| 2021/0288703 A1* | 9/2021 | Nagaraj | | H04W 16/28 |
| 2021/0352629 A1* | 11/2021 | Haghighat | | H04W 72/23 |
| 2022/0248474 A1* | 8/2022 | Liu | | H04L 5/0048 |
| 2022/0408458 A1* | 12/2022 | MolavianJazi | | H04W 72/1263 |
| 2023/0300700 A1* | 9/2023 | Rune | | H04B 17/328 |
| | | | | 370/329 |
| 2023/0388889 A1* | 11/2023 | Geng | | H04W 36/32 |

\* cited by examiner

CELL SELECTION MANAGEMENT FOR AIRBORNE MOBILE STATIONS

BACKGROUND

The present disclosure is directed, in part, to managing the cell selection for airborne mobile stations such as cellular-connected unmanned aerial vehicle (UAV) based on one or more network and/or signal propagation parameters, substantially as shown and/or describe in connection with at least one of the figures, and as set forth more completely in the claims.

According to various aspects of the technology, cell selection and reselection control for airborne mobile stations is based on any one or more selection parameters. Because conventional wireless communication networks use ultra high frequency (UHF) or higher frequencies (e.g., super high frequency (SHF) or extra high frequency (EHF)) to communicate between mobile stations and base stations, said networks are essentially limited to line of sight communications. Terrestrially, a mobile station may only have line of sight with a few different base stations; however, airborne stations, due to their height of eye, may have line of sight with numerous base stations complicating cell selection and reselection that would typically be used by mobile stations to select and connect to a base station because the signals from the plurality of base stations is likely to result in high levels of interference and higher than desirable processing power in order to select the desirable station. Using a particular methodology for cell selection and/or reselection, airborne mobile stations will maintain cellular connectivity while reducing processing power and preventing high rates of handoff.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

Figure 1:
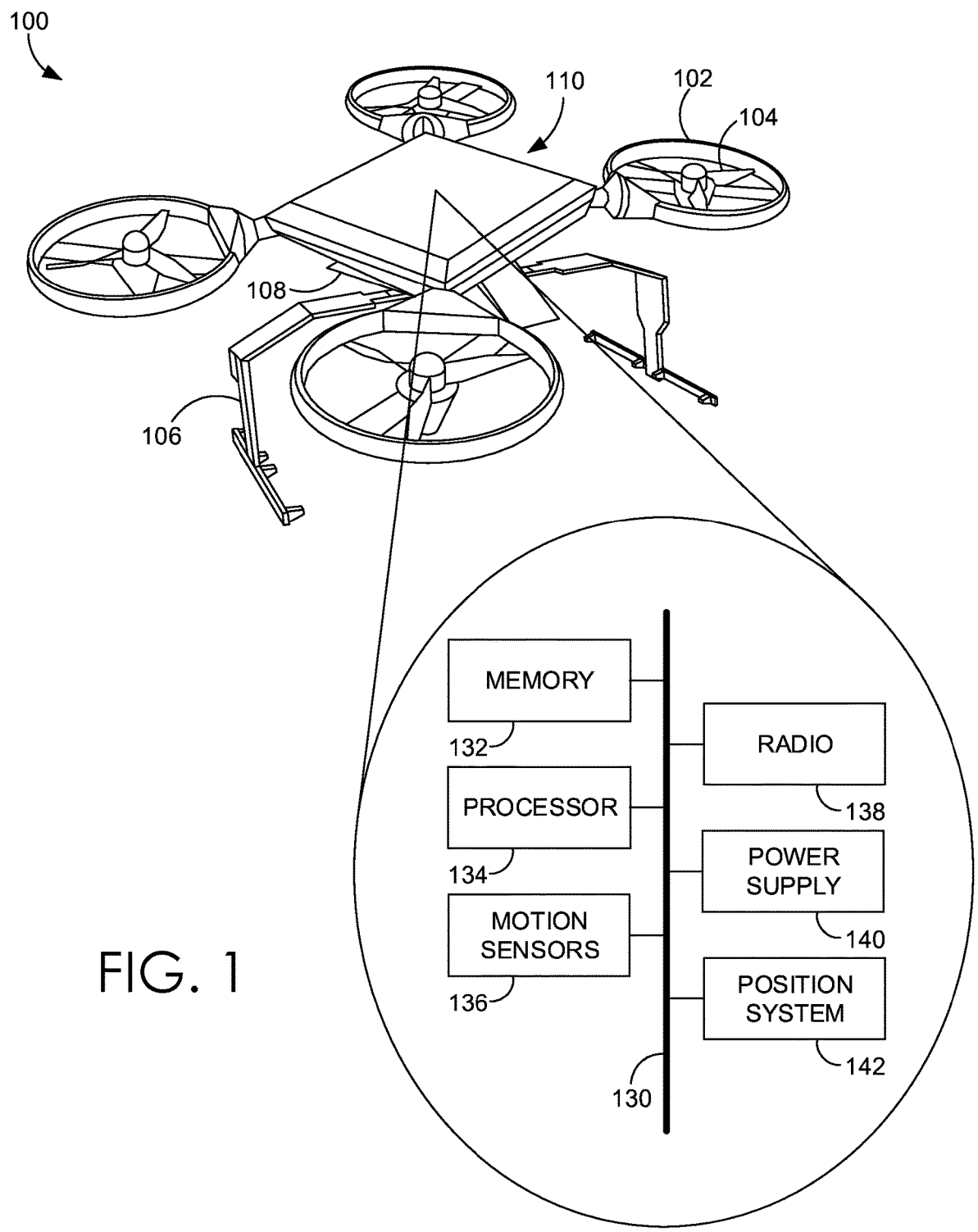
FIG. 1 illustrates a UAV compatible with operation of the airborne cell selection described herein.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. Unless otherwise indicated, acronyms are used in their common sense in the telecommunication arts as one skilled in the art would readily comprehend. Further, various technical terms are used throughout this description. An illustrative resource that fleshes out various aspects of these terms can be found in Newton's Telecom Dictionary, 31st Edition (2018).

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media. Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media. Implementations of the present disclosure may be described in the general context of computer code or machine-useable instructions, including computer-executable instructions such as program components, being executed by a computer or other computer processing component. Generally, program components, including routines, programs, objects, components, data structures, and the like, refer to code that performs particular tasks or implements particular abstract data types. Implementations of the present disclosure may also be practiced in distributed computing environments where tasks are performed by remote-processing devices that are linked through a communications network.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional wireless communication network utilizes synchronization signals to facilitate cell acquisition, selection, and reselection for UEs seeking to establish or maintain a wireless connection with the network. Conventionally, synchronization signals provide timing, frequency, or channel information to a UE. Communicated in signal blocks such as a master information block (MIB) and one or more secondary information blocks (SIBs), existing synchronization signals provide a prospective UE with information such as whether the node was barred, subcarrier spacing, qRXLevMin, qRXLevMinOffset, qQualMin, and qQualOffset.

Conventional UEs, in the form of mobile phones, hotspots, tablets, and the like, typically have limited mobility—they do not rapidly move from one candidate cell to another. Further, because most cell sites include either limited power, tilt, vertical beamsteering, or a combination of all, downlink signals from any particular cell has a limited range. When a terrestrial UE moves from one cell to another, even if there is some overlap, the UE is unlikely to observe a plurality of downlink signals from different cell sites that appear to offer equally appropriate connections. Moving forward, UEs will not be limited to ground or near ground level operation. Unmanned aerial vehicles, human-occupied airborne vehicles, and the like, present a challenge for typical cell acquisition and selection because increasing altitude is likely to increase line of sight with numerous cells. Based on the different properties of different types of downlink signals, an airborne UE could be faced with numerous equally-valid cell selection solutions. Further, because of the increased mobility of airborne UEs, it is likely that cell handover could increase because minor changes in observed signal strength/quality could trigger handover.

In order to solve the problems faced by conventional network solutions, the present disclosure is directed to systems, methods, and computer readable media that increase the efficiency of cell acquisition and selection by a UAV. In order to acquire and select a preferred cell, one or more candidate cells transmitting signals capable of being received by a UAV at a particular point and time may communicate one or more parameters, referred to herein as airborne UE parameters. The airborne UE parameters may include certain information that may be more relevant to airborne operations, such as radiation center height and vertical beamwidth. By basing cell selection on the airborne UE parameters instead of, or in combination with, conventional cell selection criteria, the UE is less likely to require handover due to a degrading connection with any particular cell. Reducing the necessity of cell handover reduces the amount of processing power required by the UE to operate, preserving battery life, and increasing operation capability.

Accordingly, a first aspect of the present disclosure is directed to a system for providing an improved wireless connection with an airborne user equipment comprising a first set of one or more antennas configured to transmit a first downlink signal having a first downlink signal radiation pattern. The system additionally comprises at least one computer processing component coupled to the first set of one or more antennas and configured to cause the transmission of a first set of one or more airborne UE parameters via the first set of one or more antennas. The first set of airborne UE parameters comprises at least one of a radiation center height of the first set of one or more antennas and a vertical beamwidth of the first downlink signal radiation pattern.

A second aspect of the present disclosure is directed to a method for cell selection by an airborne UE, the method comprising receiving a first downlink signal comprising a first set of airborne UE parameters from a first cell. The first set of airborne UE parameters comprises at least one of a radiation center height of a first set of one or more antennas of the first cell and a vertical beamwidth of a downlink signal radiation pattern associated with the first downlink signal. The method further comprises receiving a second downlink signal comprising a second set of airborne UE parameters from a second cell. The second set of airborne UE parameters comprises at least one of a radiation center height of a second set of one or more antennas of the second cell and a vertical beamwidth of a downlink signal radiation pattern associated with the second downlink signal. The method further comprises selecting the first cell for a wireless connection based on a determination that the first set of airborne UE parameters is preferable to the second set of airborne UE parameters.

According to another aspect of the technology described herein, one or more computer-readable media is provided having computer-executable instructions embodied thereon that, when executed, cause the one or more processors to perform a method comprising instructing a first cell to transmit a first set of synchronization signals via a first set of one or more antennas of the first cell, the first set of synchronization signals comprising an indication of at least one of a radiation center height of the first set of one or more antennas and a vertical beamwidth of a first downlink signal radiation pattern associated with the first set of one or more antennas.

Another aspect of the present disclosure is directed to a method comprising instructing a first cell to transmit a first set of synchronization signals via a first set of one or more antennas of the first cell. The first set of synchronization signals comprises an indication of at least one of a radiation center height of the first set of one or more antennas and a vertical beamwidth of a first downlink signal radiation pattern associated with the first set of one or more antennas.

The present disclosure relates to improved wireless communication between ground base stations and unmanned aerial vehicles (UAVs). Accordingly, FIG. 1 illustrates an exemplary UAV 100 for use with the present disclosure. As used herein, a UAV is meant to refer to any airborne vehicle/craft that is capable of operation without local human control even if a UAV may sometimes include a human on board that may elect to take control of the UAV. A UAV may operate without a human on board, but may be controlled or partially controlled remotely by a human pilot/operator. Yet other UAVs may operate autonomously by receiving instructions from a computer program. Thus, to complete an objective, a UAV may operate autonomously, under the guidance of received instructions, or under partial or total control of a remote human operator. The word "drone" may be considered to be synonymous with "unmanned system," generally, or "UAV," specifically, as used herein. The UAV 100 of FIG. 1 is illustrated as a multi-rotor aerial vehicle capable of Vertical and/or Short Take-Off and Landing (VSTOL) operations. That is, the UAV may operate more similarly to a helicopter than a conventional; however, it is expressly conceived that a wide range of UAVs are compatible for use with the present disclosure, including those that have any number of rotors, or may be a fixed-wing aircraft, or any other type of desirable form of propulsion.

The UAV 100 may be said to generally comprise a UAV body 110 and a plurality of propulsion members 102 coupled to the UAV body 110. In the illustrated embodiment, the propulsion members 102 may comprise one or more rotors or rotor heads, configured to cyclically operate one or more propellers 104. The UAV 100 may also comprise one or more landing gear 106, which may take the form of legs, wheels, skids, floats, or the like. The UAV 100 may further comprise a cargo carrying device 108, which may comprise an operable clamp/vise, cargo net, compartment, or the like, which could be used to carry a payload (e.g., for performing deliveries). The UAV 100 of FIG. 1 is but one example of a suitable UAV and is not intended to suggest any limitation as to the scope of use or functionality of the invention. Neither should the UAV 100 be interpreted as having any dependency or requirement relating to any one or combination of components illustrated.

The UAV 100 may include a plurality of onboard electrical components relevant for use with the present disclosure. The UAV includes bus 130 that directly or indirectly couples the following devices: memory 132, one or more processors 134, one or more motion sensors 136, a radio 138, a power supply 140, and a positioning system 142. Bus 130 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, processors, such as one or more processors 134, may have self-contained memory. The present disclosure hereof recognizes that such is the nature of the art, and reiterates that FIG. 1 is merely illustrative of an exemplary UAV that can be used in connection with one or more implementations of the present disclosure.

The UAV 100 typically includes a variety of computer-readable media. Computer-readable media can be any available media that can be accessed by one or more components of the UAV 100, such as the processor 134, and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 132 includes computer-storage media in the form of volatile and/or nonvolatile memory. Memory 132 may be removable, nonremovable, or a combination thereof. Exemplary memory includes solid-state memory, hard drives, optical-disc drives, etc. The UAV 100 includes one or more processors 134 that read data from various entities such as bus 130, memory 132 or I/O components 112, and may communicate with one or more electrical components such as the radio 138, the one or more motion sensors 136, and the positioning system 142. Radio 138 represents a radio that facilitates communication with a wireless telecommunications network. In aspects, the radio 138 utilizes one or more transmitters, receivers, and antennas to communicate with the wireless telecommunications network on at least one downlink/uplink channel. Though only one radio is depicted in FIG. 1, it is expressly conceived that the UAV 100 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, and the like. Radio 138 might additionally or alternatively facilitate other types of wireless communications including Wi-Fi, WiMAX, LTE, or other VoIP communications. As can be appreciated, in various embodiments, radio 138 can be configured to support multiple technologies and/or multiple radios can be utilized to support multiple technologies.

In many aspects, the UAV 100 may comprise a positioning system 142 and at least one motion sensor 136 for use in facilitating safe navigation and operation of the UAV 100. The positioning system may comprise a receiver for receiving position indicating signals (e.g., GPS, cellular signals, GLONASS, and the like) that could be processed by the processor 134 to provide real time or near real time position information of the UAV 100 or may take the form of a module that receives and processes the position indicating signals and communicates a position to the processor 134. The one or more motion sensors 136 may comprise one or more flight control sensors or collision avoidance sensors, such as an accelerometer, compass, gyro, LiDAR, RADAR, altimeter, or the like.

Figure 2:
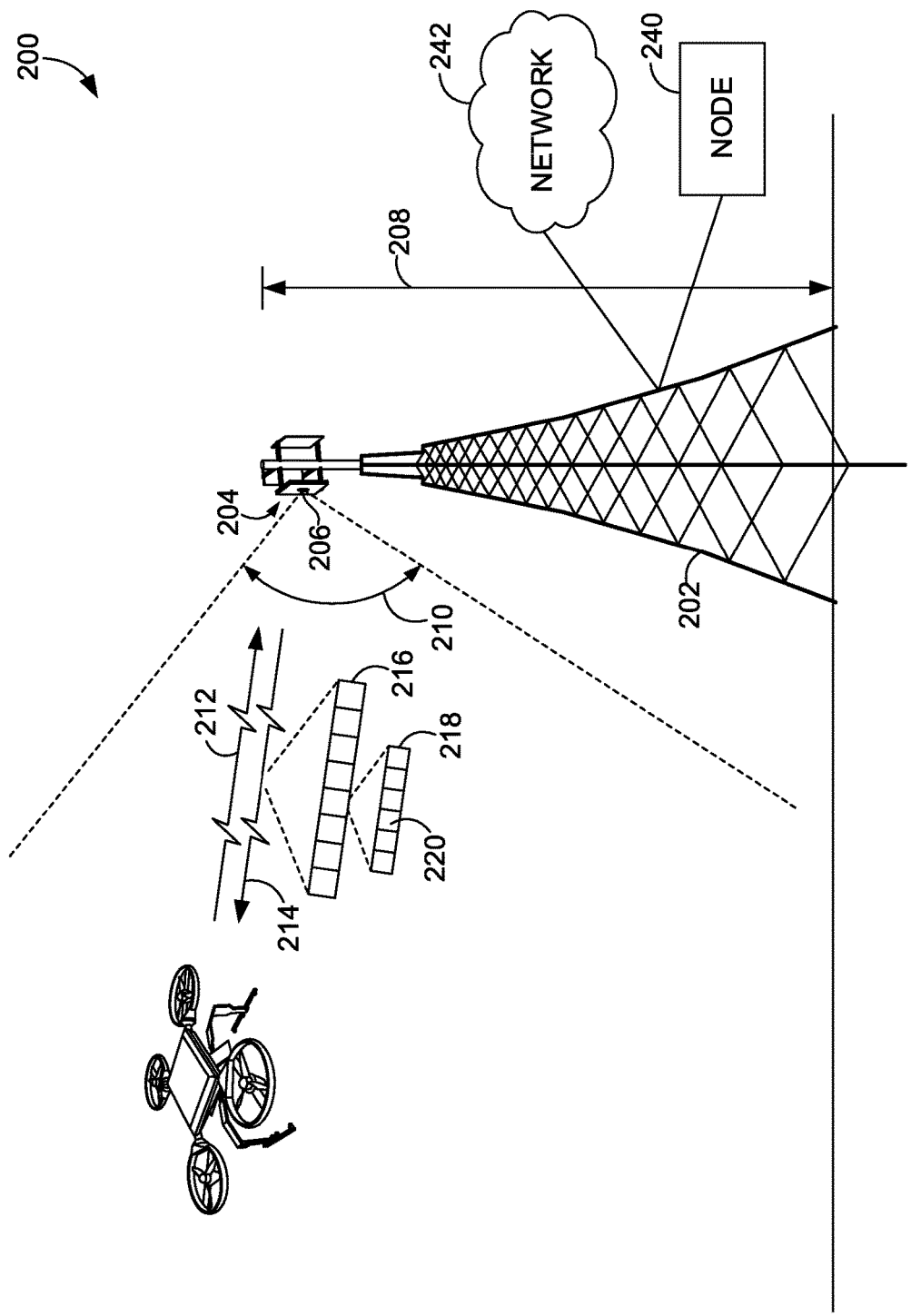
FIG. 2 illustrates a diagram of an exemplary network environment in which implementations of the present disclosure may be employed.

Turning now to FIG. 2, an exemplary network environment is illustrated in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 generally includes a cell site 202, a UAV, such as the UAV 100 of FIG. 1, and one or more components configured to wirelessly communicate between the UAV 100 and a network 242. As used herein, the term "cell site" is used to generally refer to one or more cellular base stations, RRUs control components, and the like, and may include one or more nodes 240 configured to provide a wireless interface between a wired network and a wirelessly connected user device. Each of the one or more nodes 240 may be a NodeB, eNodeB, ng-eNodeB, gNodeB, en-gNodeB, and the like, that are configured to communicate with user devices within a sector of coverage using one or more antennas of an antenna array 204 that are geographically concentrated at a particular site. Though illustrated as a macro site, the cell site 202 may be a macro cell, small cell, femto cell, pico cell, or any other suitably sized cell, as desired by a network carrier for communicating within a particular geographic area.

In some cases, UEs in network environment 200 can optionally utilize network 242 to communicate with each other and/or computing devices (e.g., a mobile device(s), a server(s), a personal computer(s), etc.) through the one or more component associated with the cell site 202. The network 242 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network 242 can include multiple networks, as well as being a network of networks, but is shown in more simple form so as to not obscure other aspects of the present disclosure. Network 242 can be part of a telecommunication network that connects subscribers to their immediate service provider. In some instances, network 242 can be associated with a telecommunications provider that provides services (e.g., data, SMS) to user devices, such as the UAV 100. For example, network 242 may provide voice, SMS, and/or data services to user devices or corresponding users that are registered or subscribed to utilize the services provided by a telecommunications provider. Network 242 can comprise any one or more communication networks providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

The antenna array 204 may take any desirable form for communicating with one or more user devices, such as the UAV 100. An uplink signal 212 may be received by the antenna array from user devices, such as the UAV 100 and a downlink signal 214 may be transmitted by the antenna array for use by said user devices. The antenna array 204 may have any desirable number of antennas, but will have at least two antennas. The antenna array 204 may comprise one or more directional antennas (e.g., yagi-uda) or one or more antennas that comprise a directional antenna system (e.g., multiple elements used with a reflector). In aspects where the node 240 is configured for communicating according to the 5G protocol(s), the antenna array 204 may comprise a massive multiple input multiple output (MIMO) array having 4, 16, 32, or 64 antennas. In aspects, the antenna array 204 is configured for beamforming, wherein one or more downlink signals can be transmitted in beams having different beam profiles. As used herein, a beam profile or a radiation pattern may be associated with a particular signal, set of signals, antenna, or set of antennas, and may be said to have a vertical beamwidth and a horizontal beamwidth; the horizontal beamwidth is the angular width (i.e., azimuth) of a beam and the vertical beamwidth is the angular height of the beam. For example, traditional macro cells may have an approximately a 120 degree horizontal beamwidth (i.e., a downlink signal is transmitted to user devices in ⅓ of the horizontal plane centered on the antenna) and a 15 degree vertical beamwidth. With respect to network environment 200, the downlink signal 214 may be said to be transmitted in a beam having a vertical beamwidth 210. In aspects, the vertical beamwidth 210 may be fixed (e.g., in a range of 7-15 degrees) or dynamic (e.g., using beamforming techniques, the vertical beamwidth 210 may change in response to network conditions or UE demand).

The antenna array 204 may be said to have a radiation center 206. The radiation center 206 is the theoretical point of origin for a signal transmitted by the antenna array 204. The antenna array 204 may be used as a whole or may be used as one or more subarrays. For example, if the antenna array 204 comprises 64 antennas arranged in an 8×8 grid, the antenna array may utilize the entire 64 element array to communicate a signal or may use a quadrant sub-array of 16 elements (one of four, 4×4 element quadrants). In each of these examples, the radiation center 206 will be different (e.g., for the 8×8, the radiation center 206 may be located at the center of the antenna array 204; whereas for the 4×4 subarray, the radiation center 206 may be located at the center of the sub array, which would not be centered on the antenna array 204). For the purposes of the present disclosure, the radiation center 206, regardless of its location on the antenna array 204 may be said to have a radiation center height 208 (e.g., a height above ground, height above sea level, or height relative to some other point of reference). For example, in the illustrated network environment 200, the radiation center 206 of the antenna array 204 located at cell site 202 may be associated with a macro cell and may have a radiation center height 208 of 100 feet above ground level. In some aspects, such as portions of FIG. 3, the cell site 202 may be located on a physical structure that is not a tower; for example, the cell site 202 may be located atop a building or mounted to a light/utility pole. For the purposes of this disclosure, the radiation center height 208 is thus distinguished from the antenna mount height because an antenna that is mounted 10 feet above a 100 foot building will have a radiation center height of approximately 110 feet, depending on the utilization of the individual antenna elements on the antenna array.

In aspects of the present disclosure, the node 240 is configured to cause the transmission of synchronization signals with additional information that would be useful for the UAV 100. The downlink signal 214 transmitted by the node 240 and emitted by the antenna array 204 may be structured in accordance with a desirable wireless communication protocol. For example, the downlink signal 214 may comprise a plurality of frames, wherein a particular frame comprises a plurality of subframes 216 and each subframe 216 comprises a plurality of OFDM symbols 218. One or more symbols may be reserved for synchronization, referred to herein as synchronization signal 220. The synchronization signal 220 is generally used by a connecting/connected UE during cell acquisition and/or cell selection/reselection. In various aspects, the synchronization signal may provide timing, frequency, or channel information to a UE and, in other aspects, may provide information about the node 240, cell site 202, or antenna array 204. Conventionally, this information, communicated in a master information block (MIB) and one or more secondary information blocks (SIBs), included information such as whether the node was barred, subcarrier spacing, qRXLevMin, qRXLevMinOffset, qQualMin, qQualOffset, and the like and was meant almost exclusively for terrestrial UEs (UEs located at or near ground level).

In order to facilitate more efficient cell acquisition and/or cell selection/reselection for UAVs, the present disclosure utilizes the node 240 to cause the transmission of additional information in one or more synchronization signals. It is forecasted that UAVs will play an important role in future logistics, including residential delivery, medical transport, and the like. Accordingly, a particular UAV may operate at an altitude that is much higher than the average terrestrial UE and may frequently change altitude as it ascends and descends between deliveries. In aspects, one or more of the synchronization signals 220 (e.g., MIB and the SIB(s)) may include information relating to transmission characteristics that would not be particularly relevant for terrestrial UEs but would facilitate wireless service provision for the UAV 100. Specifically, the synchronization signal 220 may include one or more airborne UE parameters comprising the radiation center height 208, the vertical beamwidth 210, and the horizontal beamwidth. The one or more airborne UE parameters may be inserted in a new information element along with the existing antenna configuration data that comprises the MIB and/or SIB messages.

Figure 3:
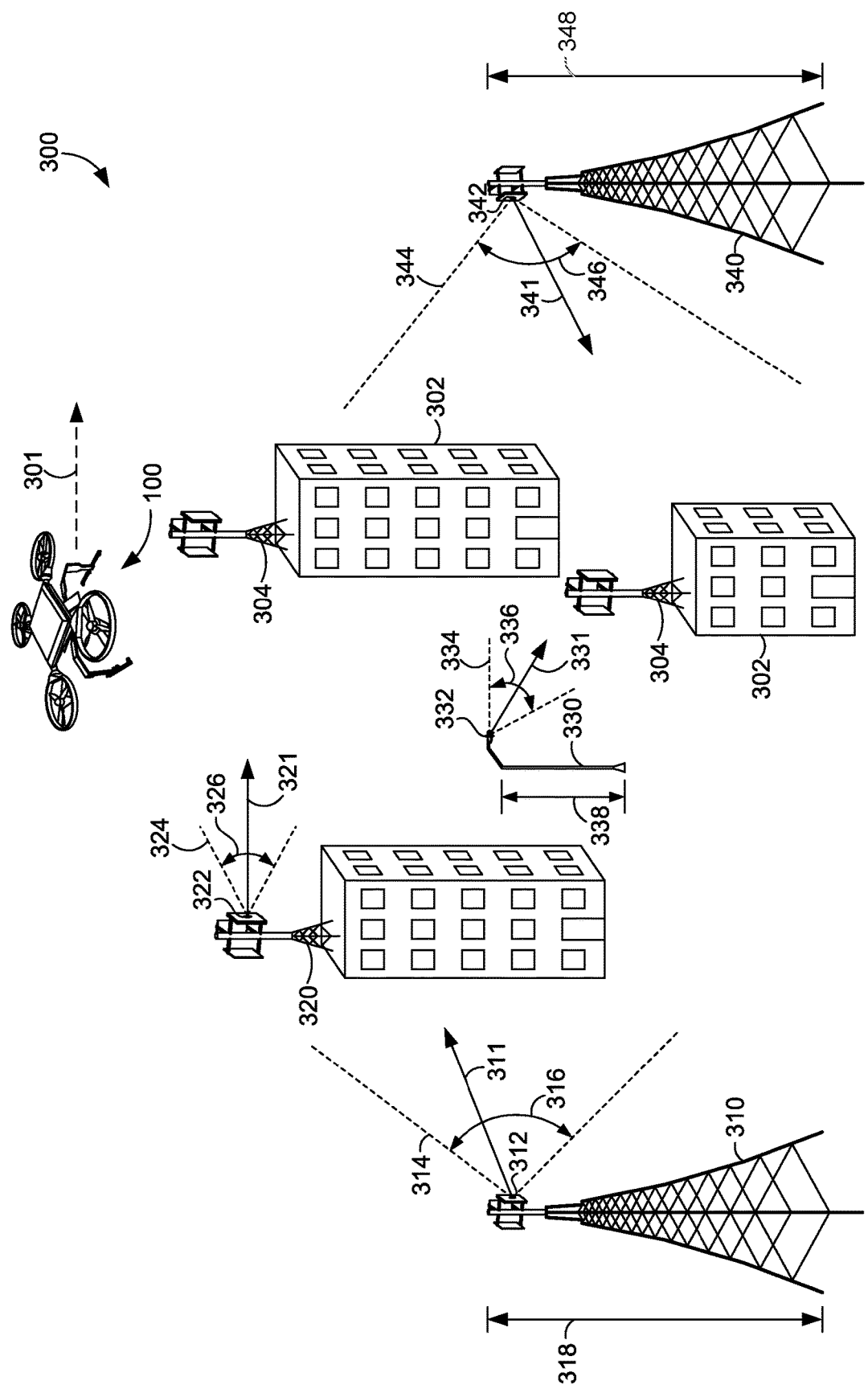
FIG. 3 illustrates a diagram of an exemplary urban network environment in which implementations of the present disclosure may be employed.

Turning now to FIG. 3, an illustration of an exemplary urban network environment 300 is depicted. Referred to as 'urban,' the present disclosure expressly conceives that methods and operations described with respect to an urban network environment such as the network environment 300 may be performed in non-urban network environments, such as the non-urban network environment 400 of FIG. 4, and vice-versa. With reference to FIG. 3, the network environment 300 may be generally said to comprise a UAV, such as the UAV 100 of FIG. 1, a plurality of structures 302, and a plurality of cells 304. It should be noted that FIG. 3 is only a representative illustration of the many and varied structures and cells that exist in a developed area such as an urban area. Specifically, network environment 300 may comprise a first cell 310, a second cell 320, a third cell 330 and a fourth cell 340, among many other cells 304 which may have characteristics in common with the first, second, third, or fourth cell 310, 320, 330, and 340. As the UAV 100 operates it may be said to have motion 301 in one or more horizontal and vertical directions. It is well known that the UAV 100 is capable of ascertaining a current location, vectors of motion, and proximity to physical objects, as well as performing dead reckoning or route planning. As airborne systems such as the UAV 100 become more prevalent in our society, they may require or benefit from cellular access, which may provide data, SMS, and/or voice services to the UAV 100. As noted above, when the UAV 100 operates at an appreciable altitude from the ground (e.g., 100 feet or more) it may have line of sight with a plurality of cells, meaning it may receive downlink signals from cells proximate and distant alike, which may cause significant interference or may necessitate additional processing power in order to process the numerous downlink signals, accelerating battery drain and reducing operational time.

The network environment 300 comprises the first cell 310. In aspects, the first cell 310 may have any one or more features of the cell site 202 of FIG. 2. The first cell 310 may comprise an antenna array with a first radiation center 312, representing the point on the antenna array where a first downlink signal 311 is emitted. The first downlink signal 311 may be generally said to be transmitted within a first beam 314 having a first vertical beamwidth 316. The first radiation center 312 may be said to be located at a first radiation center height 318. For illustration purposes, the first cell 310 is illustrated as a macro site on a tower; however, the first cell 310 may take any form described with respect to the cell site 202 of FIG. 2. The network environment 300 further comprises the second cell 320. In aspects, the second cell 320 may have any one or more features of the cell site 202 of FIG. 2. The second cell 320 may comprise an antenna array with a second radiation center 322, representing the point on the antenna array where a second downlink signal 321 is emitted. The second downlink signal 321 may be generally said to be transmitted within a second beam 324 having a second vertical beamwidth 326. The second radiation center 322 may be said to be located at a second radiation center height 328. For illustration purposes, the second cell 320 is illustrated as a macro site mounted atop a building; however, the second cell 320 may take any form described with respect to the cell site 202 of FIG. 2.

The network environment 300 further comprises the third cell 330. In aspects, the third cell 330 may have any one or more features of the cell site 202 of FIG. 2. The third cell 330 may comprise an antenna array with a third radiation center 332, representing the point on the antenna array where a third downlink signal 331 is emitted. The third downlink signal 331 may be generally said to be transmitted within a third beam 334 having a third vertical beamwidth 336. The third radiation center 332 may be said to be located at a third radiation center height 338. For illustration purposes, the third cell 330 is illustrated as a small cell mounted on a light or utility pole; however, the third cell 330 may take any form described with respect to the cell site 202 of FIG. 2. The network environment 300 additionally comprises the fourth cell 340. In aspects, the fourth cell 340 may have any one or more features of the cell site 202 of FIG. 2. The fourth cell 40 may comprise an antenna array with a fourth radiation center 342, representing the point on the antenna array where a fourth downlink signal 341 is emitted. The fourth downlink signal 341 may be generally said to be transmitted within a fourth beam 344 having a fourth vertical beamwidth 346. The fourth radiation center 342 may be said to be located at a fourth radiation center height 348. For illustration purposes, the fourth cell 340 is illustrated as a macro site on a tower; however, the fourth cell 340 may take any form described with respect to the cell site 202 of FIG. 2.

In environments such as network environment 300, cell acquisition and selection decisions for airborne systems such as the UAV 100 may be based on any one or more airborne UE parameters communicated in synchronization signals transmitted by each of the first cell 310, the second cell 320, the third cell 330, and the fourth cell 340. The airborne UE parameters may be consistently transmitted with a predetermined periodicity (e.g., 10, 20, or 40 ms) or may be transmitted when it is determined that an airborne system operating nearby (e.g., based on a nearby cell detecting an uplink signal from the UAV 100 or based on an existing connection between a nearby cell and the UAV 100). Cell selection decisions may be made in response to receiving and processing the various synchronization signals. As used herein, the term candidate cell refers to any cell of a set of two or more cells from which the UAV 100 has received decipherable synchronization signals. In one aspect, the UAV 100 may make the selection decisions between candidate cells locally; in other aspects, the decisions may be made remotely (e.g., by the cellular network) and instructions communicated to the UAV 100. As a basis for selecting a cell to connect to, the UAV 100 may consider one or more of a radiation center height, vertical beamwidth, horizontal beamwidth, and cell location of each candidate cell, alone or in combination. In some aspects, wherein multiple airborne UE parameters are considered, a weighting algorithm may be used in order to make cell selection decisions, as discussed in greater detail herein.

In a first exemplary scenario, the UAV 100 may have a set of candidate cells comprising the first cell 310 and the second cell 320, wherein each of the candidate cells are configured to communicate one or more airborne UE parameters. If the airborne UE parameters consists of a single factor (e.g., radiation center height, vertical beamwidth, or horizontal beamwidth), then the cell selection decision may be based, at least in part based on which of the candidate cells has a greater parameter (greater radiation center height, greater vertical beamwidth, etc). For example, if the airborne UE parameters only comprises radiation center height and if the first radiation center height 318 is greater than the second radiation center height 328, then the first cell will be selected. In a related example, if the airborne UE parameters comprise multiple factors but only one factor is different between the candidate cells, it may be dispositive; in other words, if airborne UE parameters comprise radiation center height and vertical beamwidth, the set of candidate cells comprises the first cell 310 and the second cell, the first vertical beamwidth 316 is approximately equal to the second vertical beamwidth 326 (e.g., within 5 or 10% or 5 degrees of each other), and the second radiation center height 328 is greater than the first radiation center height 318, then the second cell 320 may be selected.

In a second exemplary scenario, the UAV 100 may have a set of candidate cells comprising the first cell 310, the second cell 320, and the third cell 330, wherein each of the candidate cells are configured to communicate one or more airborne UE parameters. The second radiation center height 328 may be greater than the first radiation center height 318 and further greater than the third radiation center height. The second vertical beamwidth 326 may be greater than the first vertical beamwidth 316, and each may be less than the third vertical beamwidth 336. In order to make a cell selection decision, the factors may be rank ordered and assigned points (e.g., equal weighting) or a ranking or value associated with each factor may be input into a weighting algorithm. For example in the present scenario, the radiation center heights may be ranked: 1. the second cell 320; 2. the first cell 310; and 3. the third cell 330, and the vertical beamwidths may be ranked: 1. the third cell 330, 2. the second cell 320; and 3. first cell 310. Thus, between these two factors, the first cell 310 may have 5 points, the second cell 320 may have 3 points, and the third cell 330 may have 4 points, wherein the fewer number of points is associated with more preferable airborne UE parameters—the second cell 320 would be selected and the UAV 100 would connect to the second cell 320. In another aspect, even if the airborne UE parameters include multiple factors, cell selection may occur based on the highest radiation center and may only utilize a second or subsequent factor (e.g., vertical beamwidth) as a tie-breaker.

In another aspect, a weighting algorithm may be utilized taking the general form of $AP_1+BP_2+ \ldots +XP_N$, wherein A, B, ... X are the weights and P is a particular airborne UE parameter value. For example, a network or UAV operator may determine that vertical beamwidth is most important (e.g., if a particular UAV was ascending and descending repeatedly in a relatively confined area), that horizontal beamwidth is most important (e.g., if a particular UAV was staying within a relatively confined altitude but operated with greater horizontal variability), or that radiation center height is most important (e.g., if the UAV is transiting between areas and may have relatively little altitude and azimuthal variability). In one aspect, a standard weighting algorithm may be useful if the UAV 100 is to operate without any preference for one particular airborne UE parameter factor over another; such an algorithm may weigh radiation center height 1.5 times the vertical beamwidth (i.e., 60% radiation center height and 40% vertical beamwidth).

In another exemplary scenario, the UAV 100 may have a set of candidate cells comprising the first cell 310, the second cell 320, the third cell 330, and the fourth cell 340, wherein each of the candidate cells are configured to communicate one or more airborne UE parameters. If, for example, two cells were approximately equal on the basis of the airborne UE parameters, cell selection decisions may take conventional cell information into account. In a particular example, the UAV 100 may be said to be moving from left to right, along track 301. It may be determined the anticipated track of the UAV 100 is left to right, relative to FIG. 3 (e.g., utilizing the onboard motion sensors 136 and onboard positioning system 142, the UAV 100 or a remote computer processing component may dead reckon the UAV 100's future positions in time, or a flight plan may be accessed by one or more computer processing components of the wireless network, such as the network 242 of FIG. 2). Thus, in aspects where the candidate cells include numerous cells and two or more cells are approximately equally preferential candidates, it may be determined that the UAV 100 is traveling away from one cell (e.g. the first cell 310) and towards another cell (e.g., the fourth cell 340); the fourth cell 340 may be selected on the basis that the strength and/or quality of the fourth downlink signal 347 will improve and the strength and/or quality of the first downlink signal 317 will degrade. Accordingly, once the one or more airborne UE parameters have narrowed a set of candidate cells, conventional network data (e.g., RSRP, RSRQ, cell location) may be utilized to identify the preferential cell.

Figure 4:
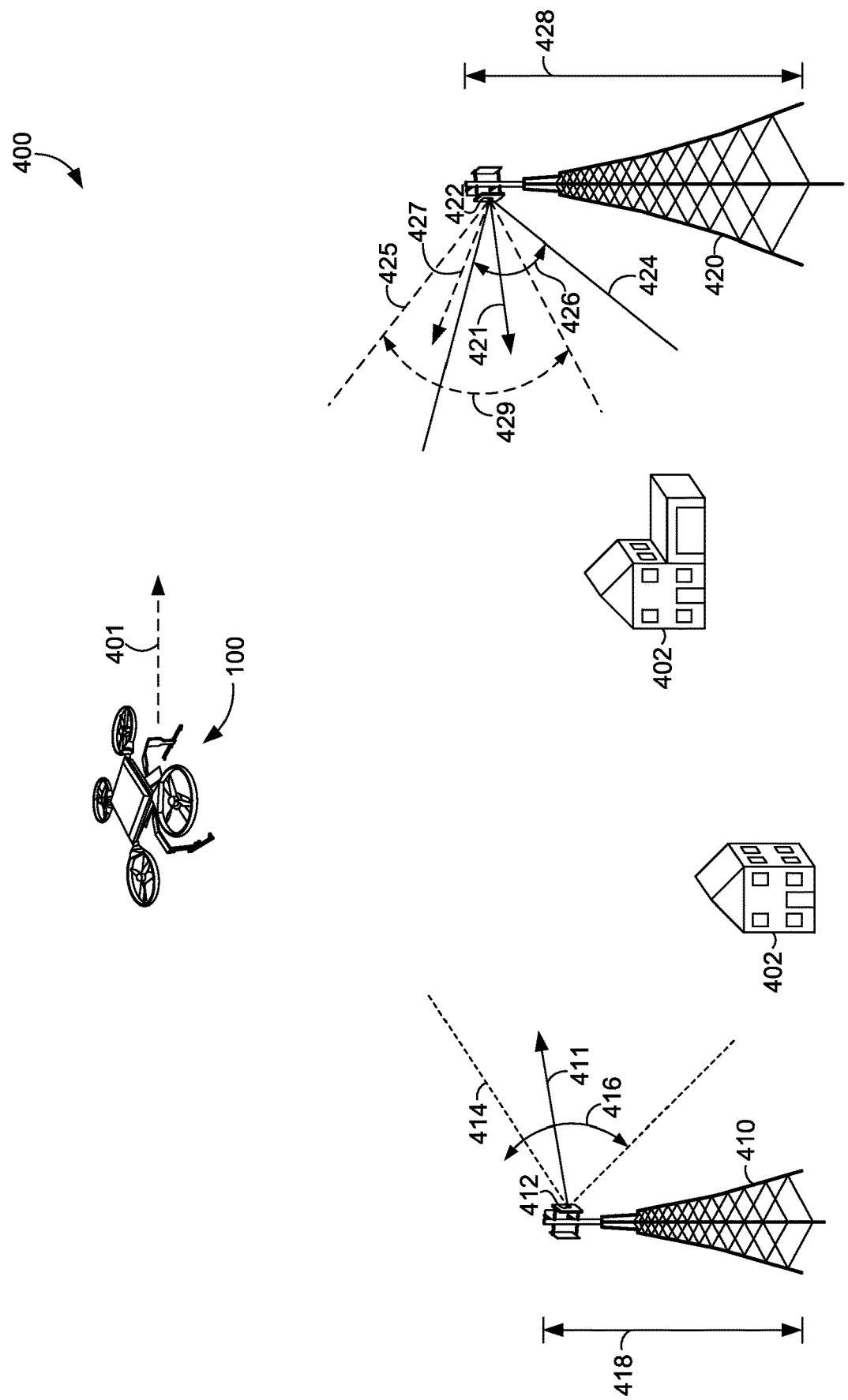
FIG. 4 depicts a flow diagram of an exemplary suburban or rural network environment in accordance with embodiments described herein.

Turning now to FIG. 4, an illustration of a non-urban network environment 400 is provided in accordance with aspects of the present disclosure. Though shown and discussed in the context of being 'non-urban,' it is expressly envisaged that any one or more features discussed with respect to FIGS. 2-3 may be executed in the context of network environment 400, and vice versa. As a general matter the non-urban network environment 400 may comprise fewer cells from which to choose and fewer structures 402, when compared to an urban network environment such as the network environment 300 of FIG. 3. Thus, signals transmitted by a plurality of cells in the non-urban environment are more likely to attenuate due to free space path loss, instead of attenuation and scatter due to buildings and other structures. Accordingly, aspects of the present disclosure may utilize frequency band information in conjunction with or in lieu of the airborne UE parameters discussed with respect to FIGS. 2-3. For example, because free space path loss is positively correlated with carrier frequency, lower frequency signals may be prioritized for a UAV such as UAV 100 of FIG. 1 that is operating within the network environment 400.

For the purposes of illustration, the network environment 400 may be said to comprise a first cell 410 and a second cell 420. In aspects, the first cell 410 may have any one or more features of the cell site 202 of FIG. 2. The first cell 410 may comprise an antenna array with a first radiation center 412, representing the point on the antenna array where a first downlink signal 411 is emitted. The first downlink signal 411 may be generally said to be transmitted within a first beam 414 having a first vertical beamwidth 416. The first radiation center 412 may be said to be located at a first radiation center height 418. For illustration purposes, the first cell 410 is illustrated as a macro site on a tower; however, the first cell 410 may take any form described with respect to the cell site 202 of FIG. 2. The network environment 400 further comprises the second cell 420. In aspects, the second cell 420 may have any one or more features of the cell site 202 of FIG. 2. The second cell 420 may comprise an antenna array with a second radiation center 422, representing the point on the antenna array where a second downlink signal 421 is emitted. The second downlink signal 421 may be generally said to be transmitted within a second beam 424 having a second vertical beamwidth 426. The second radiation center 422 may be said to be located at a second radiation center height 428. For illustration purposes, the second cell 420 is also illustrated as a macro site mounted on a tower; however, the second cell 320 may take any form described with respect to the cell site 202 of FIG. 2.

In an exemplary scenario, the UAV 100 may identify each of the first cell 410 and the second cell 420 as candidate cells in the manner described with respect to FIGS. 2-3. Incidental to principles of free space path loss, cell selection for the UAV 100 may be based on frequency, even if the UAV 100 receives airborne UE parameters. In another aspect, the UAV 100 may consider one or more of the airborne UE parameters if the first cell 410 and the second cell 420 utilize the same frequency (or same frequency band(s)). Cell selection may thus take carrier frequency of candidate cells into account in combination with airborne UE parameters when performing any cell selection methodology described with respect to FIG. 3 (e.g., equal weight of all parameters, sequential use for tiebreakers, weighted algorithms, etc.). For example, if the first cell 410 utilizes a lower frequency band than the second cell 420 and the first radiation center height 418 is greater than the second radiation center height 428, then the first cell 410 may be selected for connection with the UAV 100. In another example, if the first cell 410 utilizes a mid-band frequency (e.g., between 1-6 GHz) and the second cell 420 utilizes a low-band frequency (e.g., less than 1 GHz, such as the 600 MHz band, cell selection may consider other airborne UE parameters (e.g., the first cell 410 may be selected unless the second radiation center height 428 or the second vertical beamwidth 426 greatly exceeds that of the first cell 410). As one skilled in the art will appreciate, many other combinations of cell selection consistent with the cell selection methods discussed with respect to FIG. 3 are possible and may be desirable based on the operational needs of the UAV operator or carrier operator.

Cell selection may further be based on beamforming capabilities of one or more cells in the network environment 400. In aspects one of the cells, such as the second cell 420 may be capable of beamforming, that is, through the use of physical or electrical means, the second cell 420 may transmit a signal using multiple propagation profiles. For example, the second cell may be capable of transmitting a third downlink signal 427 in a modified beam 425 having a third vertical beamwidth 429. In such an aspect, the second cell 420 may include an indication in one or more synchronization signals that it is capable of beamforming, or capable of vertical beamforming, in particular. Cell selection may accordingly be influenced by the availability of beamforming if the first vertical beamwidth was dispositive for selection of the first cell 410 over the second cell 420 (wherein the first cell 410 is not capable of beamforming) if the third vertical beamwidth 429 was sufficient to cause the second cell 420 to be selected. In an example, if each of the first cell 410 and the second cell 420 were capable of communicating in an equivalently low frequency band and had approximately equal radiation center heights, the ability of the second cell to utilize beamforming in order to make the third vertical beamwidth 429 appreciably greater (more than 10% or 5 degrees) than the first vertical beamwidth 416 may cause the second cell to be selected.

Figure 5:
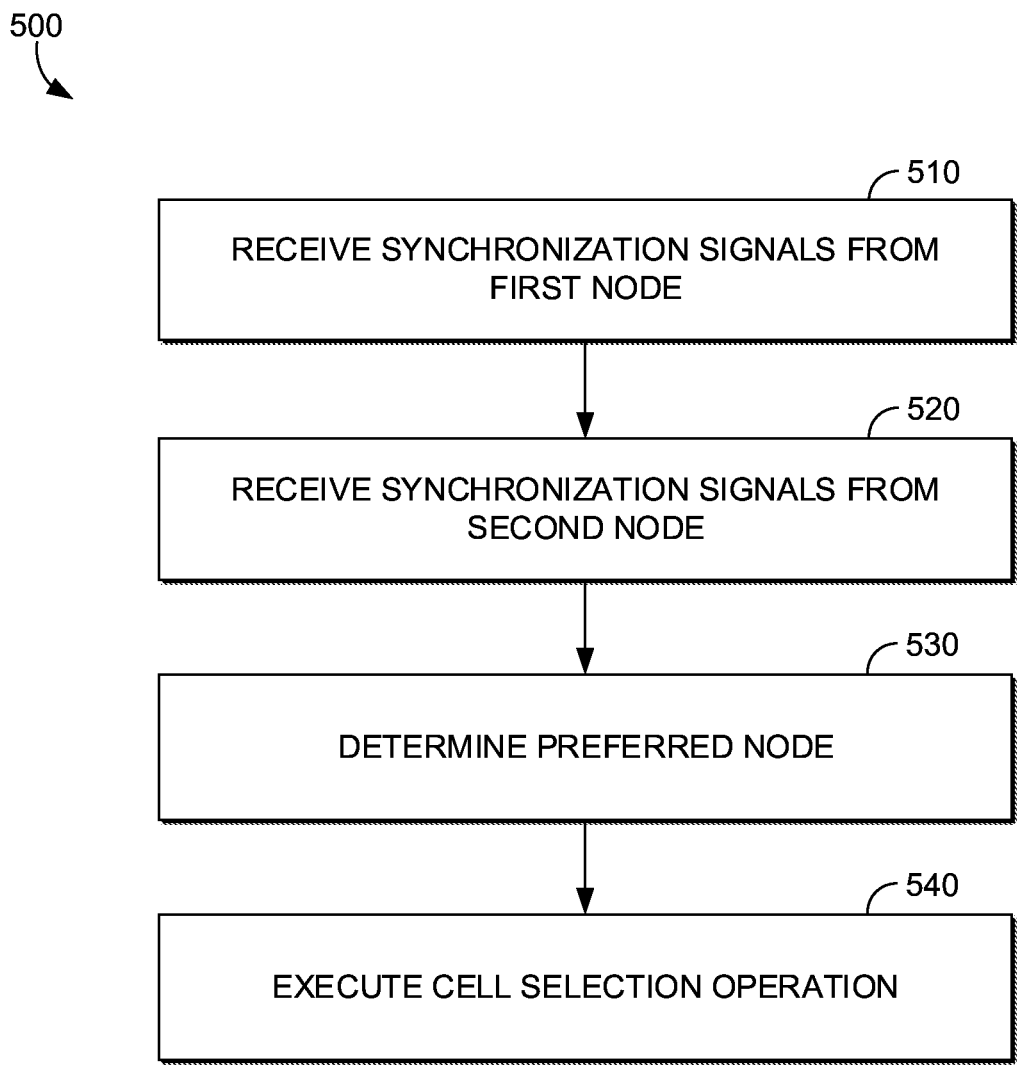
FIG. 5 depicts a flow diagram of an exemplary method for cell acquisition and selection by wirelessly connected airborne vehicles, in accordance with embodiments described herein.

Turning now to FIG. 5, a flow diagram is depicted of an exemplary method 500 for cell selection by an airborne UE. At step 510, an airborne UE, such as the airborne UE 100 of FIGS. 1-3 receives a first set of synchronization signals from a first node. At step 520, the airborne UE receives a second set of synchronization signals from a second node. The receipt of synchronization signals from each of the first and second nodes may comprise any one or more features described with respect to FIGS. 2-4. For example, each of the first and second set of synchronization signals may comprise one or more of a MIB and an SIB, either or both of which may comprise one or more airborne UE parameters for use in cell selection by an airborne UE. In aspects, the one or more airborne UE parameters may comprise one or more of the radiation center height, the vertical beamwidth, and the horizontal beamwidth of a transmitting cell. In other aspects, the one or more airborne UE parameters may alternatively or additionally comprise one or more of a beamforming capability (indicating the ability of a particular cell to perform beamforming), a frequency band availability (indicating what frequency bands are available for transmission by the cell, whether based on capability and/or bandwidth availability). The one or more airborne UE parameters may be inserted in a new information element along with the existing antenna configuration data that comprises the MIB and/or SIB messages. Specifically, the first node of step 510 may take the form of a first node in an urban environment, such as the first cell 310 of FIG. 3 and the second node of step 520 may take the form of a second node in the urban environment, such as the second cell 320, the third cell 330, or the fourth cell 340 and include any one or more features described with respect thereto. Alternatively, the first node of step 510 may take the form of a first node in a non-urban environment, such as the first cell 410 of FIG. 4 and the second node of step 520 may take the form of a second node in the non-urban environment, such as the second cell 420.

At a third step 530, a preferred node is determined. Determinations of preferred nodes for cell selection or reselection may be conducted in accordance with any one or more aspects or features described with respect to FIGS. 2-4. Specifically, selections may be based on an operating mode of the airborne UE (mostly horizontal movement, mostly vertical movement), an operating location of the airborne UE (urban or non-urban), and/or requirements of the airborne UE (data, SMS, voice, or the like). In one aspect, determinations of preferred nodes may be made by the airborne UE, based on signals received from each of the first and second nodes at steps 510 and 520. In another aspect, determinations of preferred nodes may be made by one or more computer processing components remote from the airborne UE; for example, the airborne UE may report back to one or more cells, including the first and/or second nodes, that it has received one or more synchronization signals from a plurality of nodes (e.g., the first node and the second node). In order to reduce processing power at the airborne UE, one or more network computing components, such as a network function, MME, or the like, communicatively coupled to the wireless carrier network may process the indications from the airborne UE to determine the position and movement of the airborne UE in combination with the one or more airborne UE parameters of the nodes for which synchronization signals have been received at the airborne UE. Using this information, the one or more computer processing components remote from the airborne UE may determine the preferred node and either communicate selection instructions to the UE or implement other measures, such as using a blocking indicator in a subsequent synchronization signal, to prevent the airborne UE from attaching to all but the preferred node. Finally, at a fourth step 540, a cell selection operation is executed. In aspects, the cell selection operation may comprise the airborne UE executing a cell selection or reselection based on a locally determined preferred node at step 530 or a remotely determined preferred node that has been communicated back to the airborne UE at step 530. Upon the conclusion of method 500, the airborne UE would be presumably attached to the preferred node for the airborne UE based on any one or more configurable parameters selected by the carrier or airborne UE operator.

Figure 6:
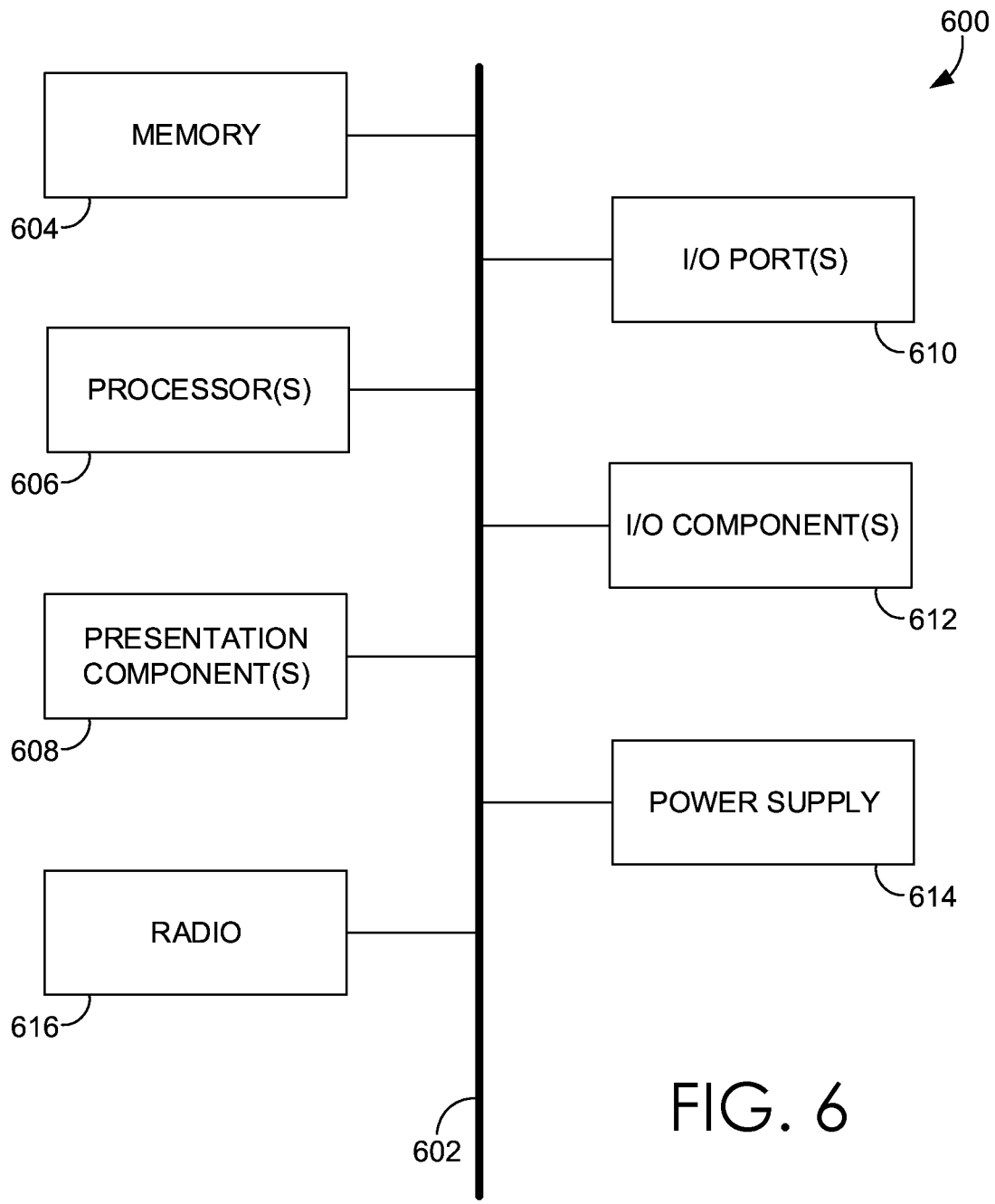
FIG. 6 depicts a diagram of an exemplary computing environment suitable for use in implementations of the present disclosure.

Turning now to FIG. 6, a diagram is depicted of an exemplary computing environment suitable for use in implementations of the present disclosure. In particular, the exemplary computer environment is shown and designated generally as computing device 600. Computing device 600 is but one example of a suitable computing environment and is not intended to suggest any limitation as to the scope of use or functionality of the invention. Neither should computing device 600 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 6, computing device 600 includes bus 602 that directly or indirectly couples the following devices: memory 604, one or more processors 606, one or more presentation components 608, input/output (I/O) ports 610, I/O components 612, and power supply 614. Bus 602 represents what may be one or more busses (such as an address bus, data bus, or combination thereof). Although the devices of FIG. 6 are shown with lines for the sake of clarity, in reality, delineating various components is not so clear, and metaphorically, the lines would more accurately be grey and fuzzy. For example, one may consider a presentation component such as a display device to be one of I/O components 612. Also, processors, such as one or more processors 606, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 6 and refer to "computer" or "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 604 includes computer-storage media in the form of volatile and/or nonvolatile memory. Memory 604 may be removable, nonremovable, or a combination thereof. Exemplary memory includes solid-state memory, hard drives, optical-disc drives, etc. Computing device 600 includes one or more processors 606 that read data from various entities such as bus 602, memory 604 or I/O components 612. One or more presentation components 608 presents data indications to a person or other device. Exemplary one or more presentation components 608 include a display device, speaker, printing component, vibrating component, etc. I/O ports 610 allow computing device 600 to be logically coupled to other devices including I/O components 612, some of which may be built in computing device 600. Illustrative I/O components 612 include a microphone, joystick, game pad, satellite dish, scanner, printer, wireless device, etc.

Radio 616 represents a radio that facilitates communication with a wireless telecommunications network. Illustrative wireless telecommunications technologies include CDMA, GPRS, TDMA, GSM, and the like. Radio 616 might additionally or alternatively facilitate other types of wireless communications including Wi-Fi, WiMAX, LTE, or other VoIP communications. As can be appreciated, in various embodiments, radio 616 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A method for cell selection by an airborne UE, the method comprising:
   receiving a first downlink signal comprising a first set of airborne UE parameters from a first cell, the first set of airborne UE parameters comprising a radiation center height of a first set of one or more antennas of the first cell, wherein the first set of airborne UE parameters are communicated via one or more information elements of a synchronization signal;
   receiving a second downlink signal comprising a second set of airborne UE parameters from a second cell, the second set of airborne UE parameters comprising a radiation center height of a second set of one or more antennas of the second cell; and
   based on a determination that the first set of airborne UE parameters, including the radiation center height, is preferable to the second set of airborne UE parameters, including the radiation center height, selecting the first cell for a wireless connection,
   wherein the determination that the first set of airborne UE parameters is preferable to the second set of airborne UE parameters comprises determining that the radiation center height of the first set of one or more antennas is within a predetermined threshold of the radiation center height of the second set of one or more antennas and that a vertical beamwidth of the downlink signal radiation pattern associated with the first downlink signal is greater than the vertical beamwidth of the downlink signal radiation pattern associated with the second downlink signal.

2. The method of claim 1, wherein each of the first set of airborne UE parameters comprises a set of available frequency bands of the first cell and the second set of airborne UE parameters comprises a set of available frequency bands of the second cell.

3. The method of claim 2, wherein, the determination that the first set of airborne UE parameters is preferable to the second set of airborne UE parameters is based on a determination that the airborne UE is operating in a non-urban environment and a determination that the set of available frequency bands of the first cell comprises a lower frequency band than the set of available frequency bands of the second cell.

4. The method of claim 1, wherein the determination that the first set of airborne UE parameters is preferable to the second set of airborne UE parameters comprises determining that a vertical beamwidth of the downlink signal radiation pattern associated with the first downlink signal is within a predetermined threshold of the vertical beamwidth of the downlink signal radiation pattern associated with the second downlink signal and that the radiation center height of the first set of one or more antennas is greater than the radiation center height of the second set of one or more antennas.

5. The method of claim 1, wherein the first set of airborne UE parameters further comprises a horizontal beamwidth of the downlink signal radiation pattern associated with the first downlink signal and the second set of airborne UE parameters further comprises a horizontal beamwidth of the downlink signal radiation pattern associated with the second downlink signal.

6. The method of claim 1, wherein the determination that the first set of airborne UE parameters is preferable to the second set of airborne UE parameters comprises determining that the first cell is capable of beamforming and that the second cell is not capable of beamforming.

7. A system for cell selection by an airborne UE, the system comprising:
   one or more antennas; and
   one or more computer processing components configured to perform operations comprising:
   receiving a first downlink signal comprising a first set of airborne UE parameters from a first cell, the first set of airborne UE parameters comprising a radiation center height of a first set of one or more antennas of the first cell, wherein the first set of airborne UE parameters are communicated via one or more information elements of a synchronization signal;
   receiving a second downlink signal comprising a second set of airborne UE parameters from a second cell, the second set of airborne UE parameters comprising a radiation center height of a second set of one or more antennas of the second cell; and
   based on a determination that the first set of airborne UE parameters, including the radiation center height, is preferable to the second set of airborne UE parameters, including the radiation center height, selecting the first cell for a wireless connection,
   wherein the determination that the first set of airborne UE parameters is preferable to the second set of airborne UE parameters comprises determining that a vertical beamwidth of the downlink signal radiation pattern associated with the first downlink signal is within a predetermined threshold of the vertical beamwidth of the downlink signal radiation pattern associated with the second downlink signal and that the radiation center height of the first set of one or more antennas is greater than the radiation center height of the second set of one or more antennas.

8. A system for cell selection by an airborne UE, the system comprising:
   one or more antennas; and
   one or more computer processing components configured to perform operations comprising:
   receiving a first downlink signal comprising a first set of airborne UE parameters from a first cell, the first set of airborne UE parameters comprising a radiation center height of a first set of one or more antennas of the first cell, wherein the first set of airborne UE parameters are communicated via one or more information elements of a synchronization signal;
   receiving a second downlink signal comprising a second set of airborne UE parameters from a second cell, the second set of airborne UE parameters comprising a radiation center height of a second set of one or more antennas of the second cell; and based on a determination that the first set of airborne UE parameters, including the radiation center height, is preferable to the second set of airborne UE parameters, including the radiation center height, selecting the first cell for a wireless connection, wherein the determination that the first set of airborne UE parameters is preferable to the second set of airborne UE parameters comprises determining that a weighted combination of the radiation center height of the first set of one or more antennas and a vertical beamwidth of the downlink signal radiation pattern associated with the first downlink signal is greater than the weighted combination of the radiation center height of the second set of one or more antennas and the vertical beamwidth of the downlink signal radiation pattern associated with the second downlink signal.

* * * * *